W. VAUDT.
SEED CORN RACK.
APPLICATION FILED AUG. 1, 1912.
1,064,401.
Patented June 10, 1913.
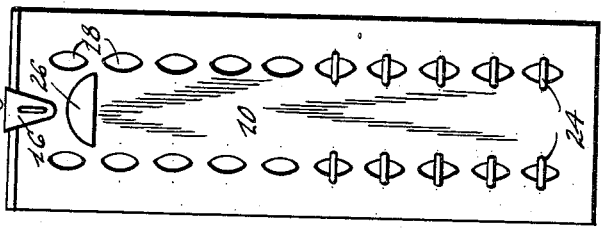
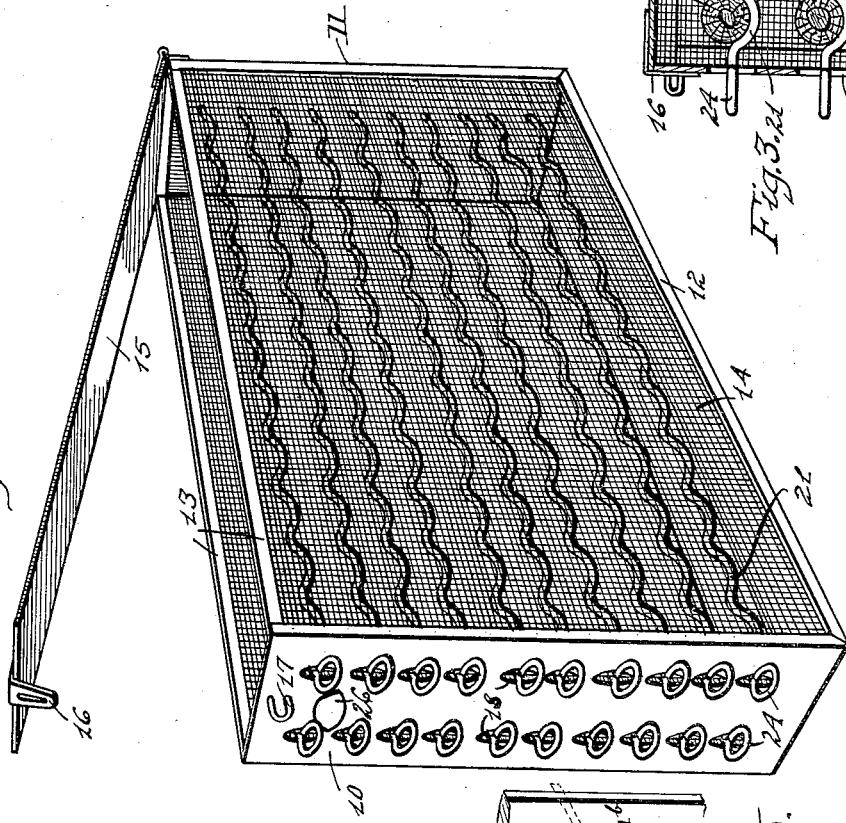
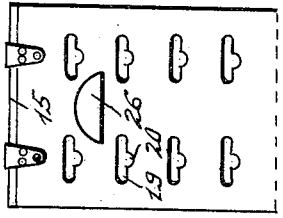
Witnesses:
W. R. Loftus.
A. J. Hague.
Inventor
William Vaudt.
by Orwig & Baily Attys
COLUMBIA PLANOGRAPH CO., WASHINGTON, D. C.

UNITED STATES PATENT OFFICE.

WILLIAM VAUDT, OF BOONEVILLE, IOWA.

SEED-CORN RACK.

1,064,401. Specification of Letters Patent. Patented June 10, 1913.

Application filed August 1, 1912. Serial No. 712,796.

*To all whom it may concern:*

Be it known that I, WILLIAM VAUDT, a citizen of the United States, residing at Booneville, in the county of Dallas and State of Iowa, have invented a new and useful Seed-Corn Rack, of which the following is a specification.

The object of my invention is to provide a seed corn rack of simple, durable and inexpensive construction, which may be entirely closed for protecting the seed corn contained therein, from the inroads of rodents and similar pests.

A further object is to provide a seed corn rack of proper width to receive an ear of corn and of considerable length and height, the sides of which may be of meshed material such as wire, and which may be provided with a hinged cover at its top.

A further object is to provide such a seed corn rack having wires detachably mounted therein in pairs, for supporting the corn.

My invention consists in certain details, in the construction, arrangement and combination of the various parts of my device, whereby the objects contemplated are attained, as hereinafter more fully set forth, pointed out in my claims, and illustrated in the accompanying drawings, in which—

Figure 1 shows a perspective view of a seed corn rack embodying my invention. Fig. 2 shows an end elevation of the same with some of the wires installed therein and with some of the wires removed. Fig. 3 shows a central, longitudinal vertical, sectional view of my improved seed corn rack, and Fig. 4 shows an end elevation showing a portion of the end opposite that shown in Fig. 2. Fig. 5 shows a modified form of the slot 18 and loop 24.

In the accompanying drawings, I have used the reference numeral 10 to indicate one end of my improved seed corn rack. The other end thereof is indicated by the reference numeral 11.

My rack is designed to be of sufficient width to receive ears of corn and of any height and length desired.

Connecting the end member 11 with the end member 10, are horizontal frame members 13. The sides and bottom of my improved seed corn rack may be made of foraminous material 14, such as meshed wire or the like. On the top of my rack is a hinged cover 15, on the free end of which is a latch member 16, designed to coact with the staple 17, or other fastening device on the end member 10.

For supporting the ears of corn within my rack, I have provided the following means: In the end member 10, I have provided a series of elliptical openings 18. The openings 18 are arranged in pairs parallel with each other in the same horizontal plane and having their longitudinal axes in vertical planes, as clearly shown in Fig. 2. In the end member 11 I have provided a plurality of openings 19 arranged in pairs opposite each pair of openings 18. The openings 19 are elongated in a horizontal plane and are provided at their centers with downwardly extending slots 20. I have provided wires 21 for supporting the ears of corn in my rack. The wires 21 are corrugated, as shown in Figs. 1 and 3. Each wire 21 is preferably provided at one end with a shoulder 22 and a handle or knob 23. At its other end, each wire 21 is provided with a loop 24. The loop 24 is so constructed and arranged that it rests in a plane at right angles to the plane in which the corrugated wire lies. Each of the wires 21 is installed in the seed corn rack in the following manner: The loop 24 is inserted through the opening 19 from the outside of the rack. The wire is then turned to permit the corrugated portion thereof to be inserted through the opening 19. The wire is then pushed into the rack until the loop 24 is adjacent on the inside of the rack to the opening 18 opposite the opening 19 through which the wire 21 was inserted. The loop 24 is then inserted through the opening 18 and turned at right angles thereto. The size of the shoulder 22 is such that it cannot be passed through the opening 19. The length of the wire 21 is such that when it is installed in the rack with the loop 24 lying in a horizontal plane, part of the loop 24 will be received in the opening 18 and the wire 21 will be held firmly against rotation. The loop 24 is of suitable size to pass readily through the opening 19 and through the opening 18 when said loop is in a vertical plane. The loop 24, however, is so large that it will not pass through the opening 18 when the loop is in a horizontal plane. The wires 21 are of somewhat resilient metal so that they will be firmly held when installed in position. The wires 21 are arranged in parallel pairs and when installed in the rack, the ears of corn 25 are placed in the successive downward corrugations and are held spaced apart by the alternating upward corrugations on said wires, as shown in Fig. 3.

I have provided suitable handles 26 for carrying my improved seed corn rack. In Fig. 5 I have shown the slot 18ᵃ having a vertical portion and a transverse extension in both directions at its lower end. The loop 24ᵃ is substantially in the form of a rectangle with a V shaped extension at one side to fit in the slot, one side of the V being a continuation of the wire 21.

In the practical use of my rack, the lid 15 is opened and assuming that none of the wires are in position, the bottom pair of wires is installed in the manner hereinbefore set forth. The ears of corn are then placed in position by placing them in the rack through the open upper end thereof, until the bottom pair of wires is full. The next pair of wires above, is then installed and filled with corn and the process is repeated until the rack is entirely filled. When it is desired to remove the corn from the rack, the lid is opened and the corn is removed from the upper pair of wires 21. Each of the upper pair of wires is then rotated until the loop 24 rests in the same plane as the longitudinal axis of the opening 18, when the head 23 may be grasped and the wire 21 may be withdrawn from the rack. When the loop 24 reaches the opening 19, the wire is again rotated to permit the withdrawal of said loop through the opening 19. The corn on the second pair of wires is then removed and so on until the rack is emptied. In the form shown in Fig. 5 the extension 24ᵇ fits into the slot 18ᵃ but is not wholly inserted therein.

My improved seed corn rack is of simple and inexpensive construction. It affords complete protection against rats and the like, is of comparatively light weight and may be readily moved from place to place. The racks may be placed together side by side or may be piled one above the other. The wires 21 are easy to install and are easily and readily removed. The corn is so arranged in the rack that it is subject to a free circulation of air at all times. The ears do not come in contact with each other and no part of their surface is in contact with the rack.

I claim as my invention:

1. In a device of the class described, flat upright end members, horizontal members connecting said end members, a hinged cover, said end members being provided with a series of opposite openings arranged in pairs at the same height in each member to secure the wires mentioned herein, a plurality of corrugated wires provided with means at their ends for preventing the rotation of said wires.

2. In a device of the class described, a support having parallel upright members, a plurality of wires arranged in pairs parallel with each other, said wires being bent to form alternate depressions and ridges, the depressions of each pair of wires being designed to receive ears of corn resting upon said wires, said wires being detachably mounted on said upright members.

Des Moines, Iowa, July 8, 1912.

WILLIAM VAUDT.

Witnesses:
Rex Spooner,
Emery Pierce.

---

Copies of this patent may be obtained for five cents each, by addressing the "Commissioner of Patents, Washington, D. C."